US 6,580,705 B1

(12) United States Patent
Riazi et al.

(10) Patent No.: US 6,580,705 B1
(45) Date of Patent: Jun. 17, 2003

(54) SIGNAL COMBINING SCHEME FOR WIRELESS TRANSMISSION SYSTEMS HAVING MULTIPLE MODULATION SCHEMES

(75) Inventors: Habib Riazi, Stafford, VA (US); Zulfiquar Sayeed, East Windsor, NJ (US); Dunmin Zheng, Vienna, VA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/428,732

(22) Filed: Oct. 28, 1999

(51) Int. Cl.[7] .............................................. H04B 7/212
(52) U.S. Cl. ...................... 370/347; 370/204; 370/208; 370/209; 370/329; 370/330; 370/350; 370/344; 375/130; 455/101; 455/102; 455/103
(58) Field of Search ................................. 370/209, 204, 370/208, 329, 330, 350, 344; 455/101, 102, 103; 375/130

(56) References Cited

U.S. PATENT DOCUMENTS 5,345,439 A * 9/1994 Marston ...................... 370/210
5,825,807 A * 10/1998 Kumar ........................ 370/203
5,838,728 A * 11/1998 Alamouti et al. ........... 332/103
6,094,162 A * 7/2000 Sullivan ...................... 337/112

* cited by examiner

Primary Examiner—Lee Nguyen
Assistant Examiner—Danh Le

(57) ABSTRACT

In a wireless transmission system that transmits the same information in parallel using two or more different types of modulation schemes, such as a satellite-based digital audio transmission system transmitting two TDM signals and a single OFDM signal, a receiver processes the differently modulated signals to generate separate demodulated signals that are then combined to form a single combined signal for further processing (e.g., decoding). In one embodiment, the receiver applies a maximal ratio combining (MRC) technique to generate a single optimal ratio combined signal from the differently modulated signals. By combining the differently modulated signals using an MRC technique, the adverse affects of noise related to inter-symbol interference in the individual signals can be reduced and the complexity of hardware in the receiver can be reduced.

20 Claims, 3 Drawing Sheets

SIGNAL COMBINING SCHEME FOR WIRELESS TRANSMISSION SYSTEMS HAVING MULTIPLE MODULATION SCHEMES

BACKGROUND OF THE INVENTION

1. Field of the Invention

The present invention relates to wireless transmission systems.

2. Description of the Related Art

Transmitted signals of a digital transmission system are usually configured to a single modulation scheme. The modulation scheme is often determined as a result of the region in which the signal is to be transmitted. For instance, time division multiplexed (TDM) signals are typically suited for rural areas whereas orthogonal frequency multiplexed (OFDM) signals are typically suited for urban areas.

TDM signals are suited for rural areas, where there is typically a clear line-of-sight (LOS) between a satellite transmitter and a ground-based receiver. Often a time-delayed signal may also be transmitted to compensate for short-term signal outages that may occur when there is an obstruction in the LOS signal path (e.g., when a mobile receiver passes under an overpass). In such cases, after the direct LOS connection has been reestablished, any data in the "on-time" LOS signal that was lost during the temporary obstruction will be available from the time-delayed TDM signal.

In urban areas, buildings and other structures form potentially long-lasting LOS obstructions. They also tend to act as a source of reflections leading to multipath signal distortions. Consequently, TDM-based service is often unacceptable in such urban areas. Since OFDM signals are well-suited for regions, such as urban areas, having LOS obstructions and multipath signals, OFDM signals are typically used.

Since each type of signal is ideally suited for different operating conditions, it is typical to use each signal only in the region suited for each signal. Additionally, it is typical to encounter increased noise at transition regions where, for example, a mobile receiver may be changing between TDM service and OFDM service. Noise at such transition regions often causes signal degradation, handoff failures, and signal losses, which detrimentally affect the quality of the service.

SUMMARY OF THE INVENTION

The present invention is directed to a technique for improving the quality of service for wireless transmission systems that employ two or more different modulation schemes to transmit the same information in parallel, such as satellite-based digital audio transmission systems that transmit digital audio data using both TDM and OFDM modulation schemes.

In the satellite-based digital audio transmission system, two TDM signals and one OFDM signal are used. A transmitter transmits two TDM signals that carry the same information, where one signal is delayed in time (e.g., by a few seconds) in relation to the other. The two TDM signals are used to compensate for short-term signal outages that may occur when there is an obstruction in the LOS signal path (e.g., when a mobile receiver passes under an overpass). The transmitter also transmits an OFDM signal which is typically used as a terrestrial gap filler signal for regions where TDM signals do not provide acceptable service. In particular, OFDM signals carrying the same information as the TDM signals are transmitted in parallel with the TDM signals, and terrestrial OFDM repeaters are deployed to fill the regional gaps in the TDM service.

According to one embodiment of the present invention, for TDM/OFDM digital audio transmission systems, a TDM/OFDM transmitter transmits two TDM signals and a single OFDM signal that are then received at a receiver. The two TDM signals (i.e., the on-time TDM signal and the time-delayed TDM signals) and the single OFDM signal received at a mobile receiver are combined using suitable signal combining techniques to generate a single combined signal for subsequent signal processing (e.g., signal decoding). By combining the differently modulated signals, the adverse affects of noise in the individual signals can be reduced. As a result, the occurrence of signal losses and handoff failures may also be reduced.

In general, the principles of the present invention can be applied to improve the quality of service for any signal transmission system that uses two or more different modulation schemes to transmit the same information in parallel. Satellite-based digital audio transmission systems based on TDM and OFDM modulation schemes are just one particular application of the present invention.

In one particular implementation of the present invention for a TDM/OFDM digital audio transmission system, the two TDM signals (i.e., the on-time TDM signal and the time-delayed TDM signals) and the single OFDM signal are received at a receiver, where they are demodulated and combined using a maximal ratio combining (MRC) technique to generate a combined signal for further processing (e.g., decoding). The combining of the two differently-modulated signals reduces the adverse effects of noise, thereby improving quality of service.

In one embodiment, the present invention is a method for processing wireless signals, comprising the steps of (a) receiving two or more wireless signals containing a common set of information and conforming to two or more different modulation schemes; (b) demodulating each of the received wireless signals using a corresponding different demodulation scheme; and (c) combining the two or more demodulated signals using a signal combining technique to generate a combined signal.

In another embodiment, the present invention is an apparatus for processing wireless signals, comprising (a) an antenna, configured to receive an analog signal corresponding to two or more wireless signals containing a common set of information and conforming to two or more different modulation schemes; (b) a converter, electrically connected to the antenna and configured to convert the analog signal to a baseband signal; (c) a separator, electrically connected to the converter and configured to separate the baseband signal into two or more sub-signals corresponding to the two or more wireless signals; (d) for each sub-signal, a demodulator electrically connected to the separator and configured to apply demodulation processing corresponding to the modulation scheme for the corresponding sub-signal; (e) a synchronizer, electrically connected to each demodulator and configured to synchronize each demodulated sub-signal; and (f) a signal combiner, electrically connected to the synchronizer and configured to combine the two or more demodulated sub-signals using a signal combining technique to generate a combined digital signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention may be implemented in a one-way digital audio transmission system (e.g., digital radio) that uses two or more differently-modulated signals, such as TDM and OFDM signals to transmit the same information in parallel using adjacent frequency bands. More particularly, in a preferred embodiment of the present invention, two TDM signals (an on-time signal and a time-delayed signal) and a single OFDM signal, are combined using a maximal ratio combining technique to generate a single combined signal for subsequent signal processing (e.g., signal decoding). Accordingly, the adverse affects of noise related e.g., to inter-symbol interference in the individual signals is reduced as is the occurrence of signal losses and handoff failures. For the present invention, there is a reduced need for receiver complexity and receiver hardware since a single de-interleaver and a single channel decoder may be used for all three of the received signals.

Figure 1:
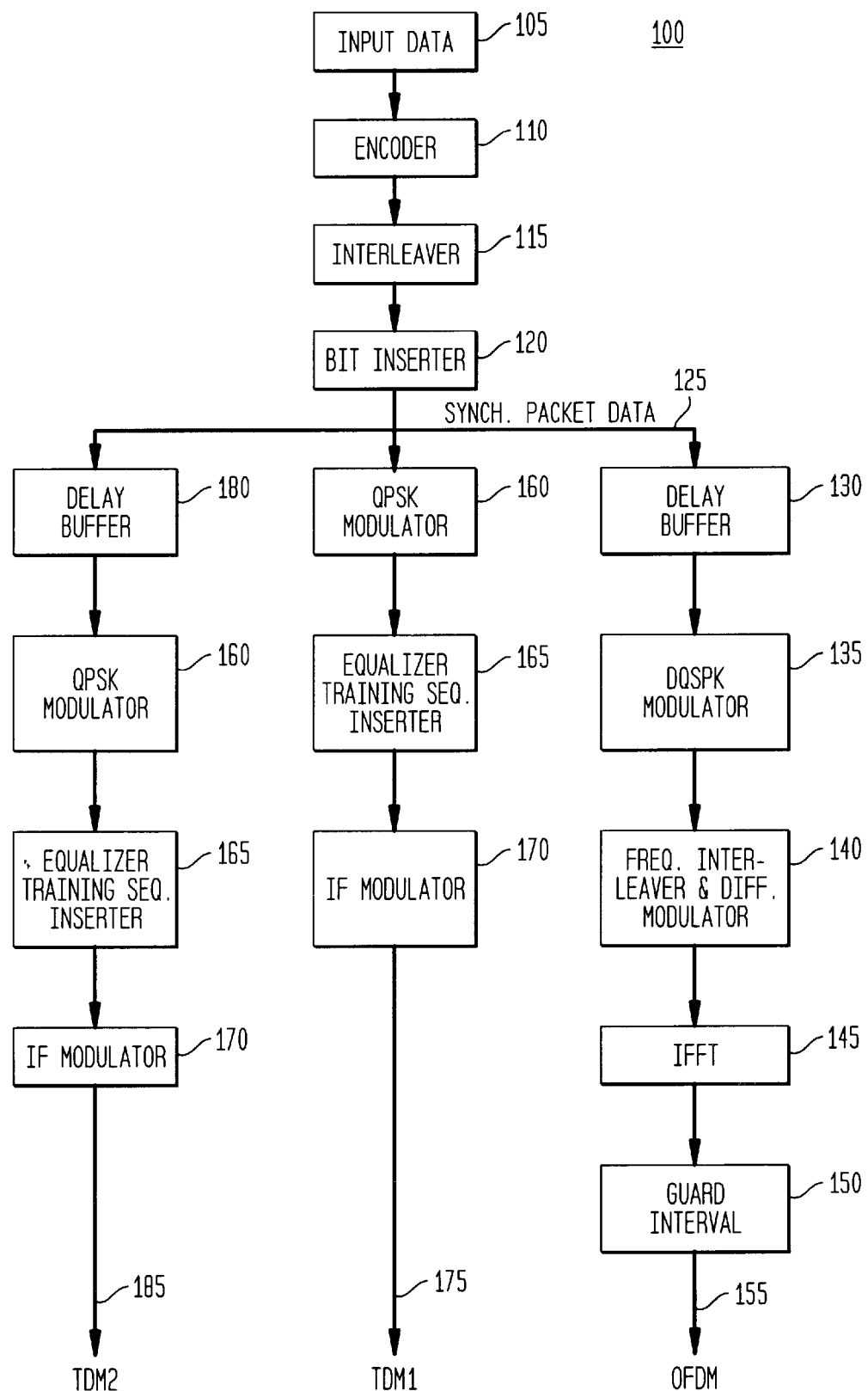
FIG. 1 shows a block diagram of a transmitter for a satellite-based transmission system utilizing both TDM and OFDM signals, according to the present invention.

FIG. 1 shows a block diagram of a TDM/OFDM transmitter 100 of the present invention. The transmitter 100 is a common source for two TDM signals—TDM1 175 and TDM2 185—and one OFDM signal 155. The first TDM signal 175 is an on-time signal, and the second TDM signal 185 is a time-delayed signal. The input data is formatted and transmitted by the transmitter 100 such that the different signals may be received at a receiver (not shown in Figure 1) with acceptable differential delays.

The input data 105, which is typically binary data, is encoded by a channel encoder 110 to add redundancy to the data sequence. An interleaver 115 interleaves the resulting encoded symbols for output as interleaved symbols in packet data frames. A bit inserter 120 inserts synch bits into the packet data frames to generate synchronized packet data 125. Frame synchronization is generally known in the art, and other synchronization methods may be additionally or alternatively used in the present invention. Copies of the synchronized packet data 125 are then processed in parallel to generate the three output signals for parallel transmission: OFDM signal 155, TDM1 signal 175, and TDM2 signal 185.

In particular, the TDM1 signal 175 is generated by modulating one copy of the synchronized packet data 125 at a quadrature-phase shift-key (QPSK) modulator 160, inserting equalizer training symbols at regular intervals (e.g., every 1 msec) at an equalizer training sequence inserter 165, and further modulating using an IF modulator 170 to position the signal in the desired band.

The TDM2 signal 185 is generated using an analogous sequence of QPSK modulator 160, equalizer 165, and IF modulator 170, but before doing so, the corresponding copy of the synchronized packet data 125 is delayed at delay buffer 180 for a specified time (e.g., about 4 seconds). This delay is added to the second TDM signal to provide continuity of data to a mobile receiver which is temporarily blocked by an obstacle.

For the OFDM signal 155, the corresponding copy of the synchronized packet data 125 is also delayed at a delay buffer 130 for a specified time that is preferably identical to the delay used in generating the TDM2 signal 185. By using the same delay for both the OFDM signal 155 and the TDM2 signal 185, a receiver of all three transmitted signals will only have to buffer the first on-time TDM1 signal 175. The delayed signal is then modulated at differential QPSK (DQPSK) modulator 135 to produce a DQPSK constellation. The data is then modulated by a differential modulator over frequency 140 and encoded by an inverse fast Fourier transform (IFFT) 145 which outputs a complex function having imaginary and real parts. A guard interval (GI) is introduced at a guard interval block 150 to mitigate channel multipath effects. The duration of the guard interval is preferably greater than the maximum expected delay spread of the channel.

Figure 2:
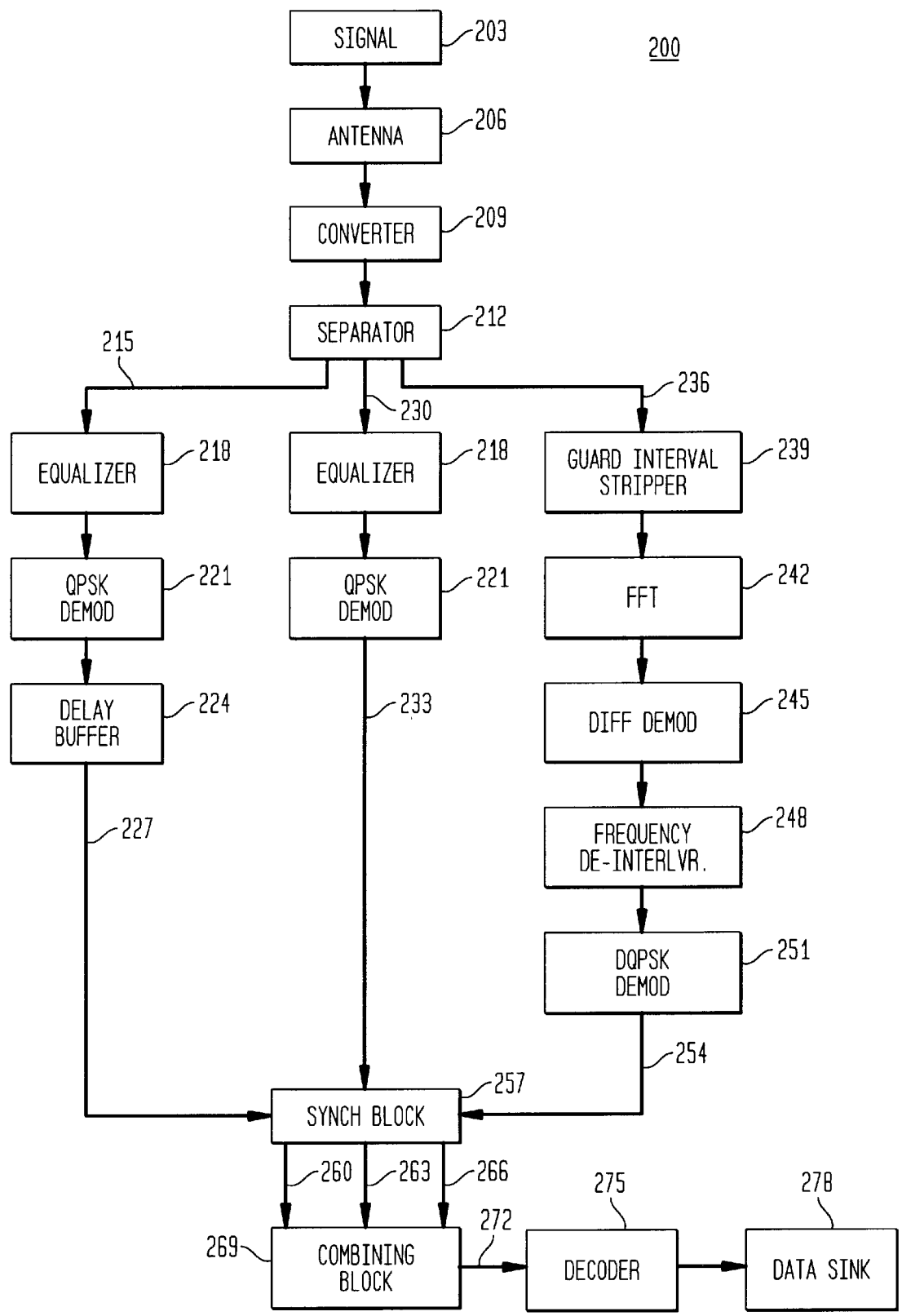
FIG. 2 shows a block diagram of a receiver according to one embodiment of the present invention.

FIG. 2 shows a block diagram of a receiver 200, according to one embodiment of the present invention. In general, the received signal is first converted to baseband and is then separated into its corresponding bands. Alternatively, the received signal is separated into its corresponding bands before converting the signal to baseband. Equalizing symbols and guard intervals are removed as necessary, and the signals are demodulated in accordance with their particular modulation scheme. Time delays are added to synchronize the demodulated signals as needed. The time-aligned outputs are then combined using a maximal ratio combining technique to generate a single signal output for subsequent decode processing.

In particular, the signal 203 received at an antenna 206 is converted to baseband data by a converter 209. A separator 212 then separates the converted baseband output into three bands 215, 230, and 236, corresponding to the TDM1, TDM2, and OFDM signals, respectively.

Each of TDM1 215 and TDM2 230 is equalized as a complex function by an equalizer 218 which also removes the equalizer training symbols by a stripping function implemented within the equalizer 218. The complex output from each equalizer 218 is then demodulated by a QPSK demodulator 221. Since the TDM2 signal is delayed with respect to the TDM1 signal, after demodulator 221, the TDM1 data is delayed at a delay buffer 224 by an amount equivalent to the delay of the TDM2 signal (e.g., 4 seconds) to synchronize the two TDM signals. The two resulting TDM signals 227 and 230 are input into a signal synchronizing block 257.

For the OFDM signal, following separation at the separator 212, the guard interval on the OFDM signal 236 is removed by a guard interval stripper 239. Once removed, the differentially modulated data of the OFDM signal 236 undergoes a fast Fourier transform (FFT) operation 242 to recover the differentially modulated data. The output of the FFT operation is then differentially demodulated by a differential demodulator 245. The output from the demodulator 245 is then de-interleaved by a frequency de-interleaver 248 to separate sub-carriers from the resulting de-interleaved signal. The output de-interleaved signal is then DQPSK-demodulated by a DQPSK demodulator 251, resulting in a mapping of real and imaginary soft bits in the OFDM signal output 254, which is also input into the signal synchronizing block 257.

Each of the demodulated signals 227, 233, and 254 is a complex digital signal having an imaginary part and a real part, wherein each may therefore be represented as a complex vector function in a complex plane having imaginary and real axes. In the synchronizing block 257, each of the demodulated signals 227, 233 and 254 is time-aligned, has synch bits removed, and is weighted by its signal-to-noise ratio (SNR) such that the three signals are output from the synchronizing block 257 as TDM1 signal 260, TDM2 signal 263, and OFDM signal 266 as input to the combining block 269. Combining block 269 combines the three time-aligned, SNR-weighted signals 260, 263, and 266 to generate a combined output signal 272. In a preferred embodiment, the combining block 269 employs a maximal ratio combining technique to generate an optimal ratio combined signal 272, which is then input into a channel decoder 275 whose output is stored in a data sink 278. In an MRC technique, signals are combined according to $r_1*sqrt(SNR_1)+r_2*sqrt(SNR_2)+r_3*sqrt(SNR_3)$, in which each r represents data information in the corresponding signal and each SNR is the signal-to-noise ratio estimate for the corresponding signal obtained as described further below.

Figure 3:
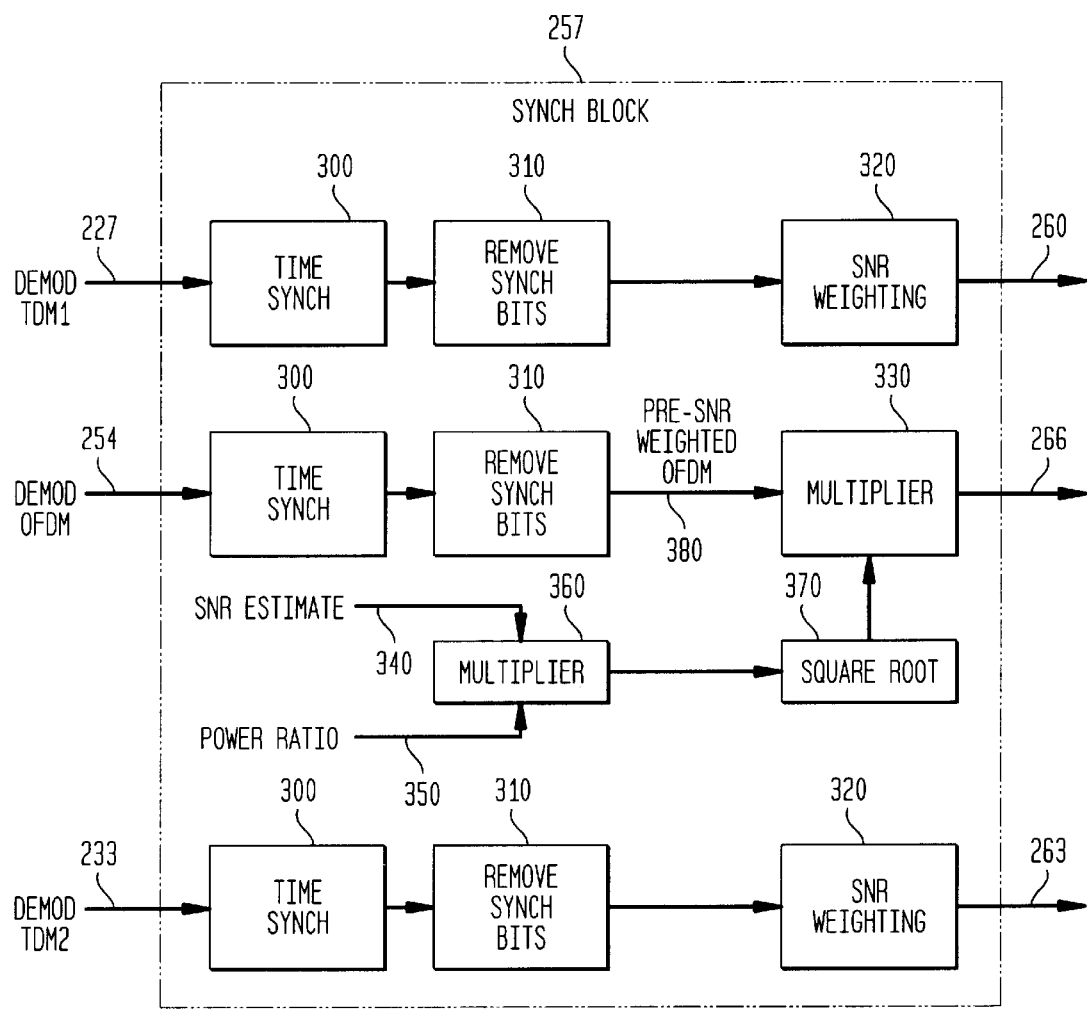
FIG. 3 shows details of the synchronizing block generating inputs to the combining block of FIG. 2.

FIG. 3 shows details of the synchronizing block 257 of FIG. 2. Each of the demodulated signals 227, 233, and 254 is time synchronized by a data synchronizer 300, and has synch bits removed by a bit stripper 310. The output signal from each stripper 310 is then weighted by its signal-to-noise ratio (SNR). For example the time-aligned, demodulated OFDM signal 380 is multiplied at a multiplier 330 by its respective SNR factor to SNR-weight the signal.

SNR estimation is known in the art. It is known to estimate SNR values for TDM signals such as 227 and 233. For example, it is known to obtain an SNR estimate for a TDM signal by obtaining the a priori knowledge of the synch symbols of the signal and estimating the noise from the hard decisions of the signal following demodulation. Each TDM signal is then SNR-weighted in relation to its respective SNR estimate as determined by the equalizer block 218.

Similarly, SNR estimation for OFDM signals is known in the art and is often estimated by known algorithms. As an example, an SNR estimate may be determined in relation to the complex output of a demodulator and its sub-carrier gain. Other methods of SNR estimation are known and are incorporated herein. It is desired to weight the OFDM demodulated soft bits in relation to the power and the SNR estimates for each signal, thereby utilizing the signal's complex nature and rotation to the first quadrant, then a majority of the signal lies on the real axis and the noise is predominately concentrated in the imaginary axis. The demodulated and time-aligned OFDM signal 380 is weighted in relation to the square root of the product of the SNR estimate 340 and the power ratio 350. The power ratio 350 is the ratio of the OFDM signal power to the average power of the two TDM signals. As such, a product factor is determined at the multiplier 360 as a result of the SNR estimate 340 multiplied by the power ratio 350. The value of the square root 370 of the product factor is then determined. The time-aligned, demodulated OFDM signal 380 is then SNR-weighted by multiplying the result of 370 with the signal 380, resulting in signal 266.

In the preferred embodiment of the present invention, all three of the signals are operating at the same coded data throughput rate. The duration of the training sequence, the training-sequence-to-data-sequence length ratio, and the guard interval may be predetermined for each signal to ensure that the three received signals, following digital demodulation, produce the same encoded data stream with independent noise and channel distortion at a constant rate.

While the exemplary embodiments of the present invention have been described with respect to processing of OFDM and TDM signals, including possible implementation as in an audio transmission system, the present invention is not so limited. As would be apparent to one skilled in the art, various other signals and modulation schemes, including QAM and higher order PSK, may also be used. Additionally, signal combining techniques other than MRC may also be implemented such as switched combining, which selects the best signal and prevents the poorer signal from entering the combiner.

The present invention may be implemented as circuit-based processes, including possible implementation on a single integrated circuit. As would be apparent to one skilled in the art, various functions of circuit elements may also be implemented in the digital domain as processing steps in a software program. Such software may be employed in, for example, a digital signal processor, micro-controller, or general-purpose computer.

While the exemplary embodiments of the present invention have been described with respect to processes of circuits, including possible implementation as a single integrated circuit, the present invention is not so limited. As would be apparent to one skilled in the art, various functions of circuit elements may also be implemented in the digital domain as processing steps in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A transmitter, comprising:
   (a) an encoder to add redundancy to a data sequence;
   (b) an interleaver connected to the encoder to output encoded symbols as interleaved symbols in data frames;
   (c) an inserter connected to the interleaver to insert synch bits into data frames to generate synchronized data, of which copies of the synchronized data undergo further processing;
   (d) a first modulator for modulating a first copy of the synchronized data to generate a signal having a first modulation scheme; and
   (e) a second modulator for modulating a second copy of the synchronized data to generate a signal having a second modulation scheme.

2. The transmitter of claim 1, wherein:
the first modulator is a DQSPK modulator and the first modulation scheme is OFDM.

3. The transmitter of claim 1, wherein:
the second modulator is a QSPK modulator and the second modulation scheme is TDM.

4. The transmitter of claim 1, further comprising a third modulator for modulating a third copy of the synchronized data to a generate a time-delayed signal having a third modulation scheme.

5. The transmitter of claim 4, wherein:
the third modulator is a DQSPK modulator and the third modulation scheme is TDM, wherein the time-delayed signal is delayed by a delay buffer configured with the third modulator to a known delay value.

6. The transmitter of claim 1, wherein:
the first modulator is adapted to generate an OFDM signal; and
the second modulator is adapted to generate a TDM signal.

7. The transmitter of claim 6, wherein:
the first modulator performs DQPSK modulation followed by a differential modulation over frequency; and
the second modulator performs QPSK modulation.

8. The transmitter of claim 1, further comprising a third modulator for modulating a third copy of the synchronized data to a generate a signal having a third modulation scheme.

9. The transmitter of claim 8, wherein:
the first modulator is adapted to generate an OFDM signal;
the second modulator is adapted to generate a first TDM signal;
the third modulator is adapted to generate a second TDM signal.

10. The transmitter of claim 9, wherein the OFDM signal and the second TDM signal are time-delayed relative to the first TDM signal.

11. The transmitter of claim 10, wherein:
the first modulator comprises a delay buffer followed by a DQPSK modulator followed by a frequency interleaver and difference modulator, followed by an inverse fast Fourier transform (IFFT), followed by a guard interval block;
the second modulator comprises a QPSK modulator followed by an equalizer training sequence inserter followed by an intermediate frequency (IF) modulator; and
the third modulator comprises a delay buffer followed by a QPSK modulator followed by an equalizer training sequence inserter followed by an IF modulator.

12. The transmitter of claim 9, wherein:
the first modulator performs DQPSK modulation followed by a differential modulation over frequency;
the second modulator performs QPSK modulation; and
the third modulator performs QPSK modulation.

13. A transmitter, comprising:
(a) an encoder adapted to encode input data;
(b) an interleaver adapted to generate interleaved data from encoded data generated by the encoder;
(c) an inserter adapted to insert synch bits into the interleaved data to generate synchronized data;
(d) a first modulator adapted to modulate a first copy of the synchronized data using a first modulation scheme to generate a first modulated signal; and
(e) a second modulator adapted to modulate a second copy of the synchronized data using a second modulation scheme to generate a second modulated signal.

14. The transmitter of claim 13, wherein:
the first modulator is adapted to generate an OFDM signal; and
the second modulator is adapted to generate a TDM signal.

15. The transmitter of claim 14, wherein:
the first modulator performs DQPSK modulation followed by a differential modulation over frequency; and
the second modulator performs QPSK modulation.

16. The transmitter of claim 13, further comprising a third modulator for modulating a third copy of the synchronized data to a generate a signal having a third modulation scheme.

17. The transmitter of claim 16, wherein:
the first modulator is adapted to generate an OFDM signal;
the second modulator is adapted to generate a first TDM signal;
the third modulator is adapted to generate a second TDM signal.

18. The transmitter of claim 17, wherein the OFDM signal and the second TDM signal are time-delayed relative to the first TDM signal.

19. The transmitter of claim 18, wherein:
the first modulator comprises a delay buffer followed by a DQPSK modulator followed by a frequency interleaver and difference modulator, followed by an inverse fast Fourier transform (IFFT), followed by a guard interval block;
the second modulator comprises a QPSK modulator followed by an equalizer training sequence inserter followed by an intermediate frequency (IF) modulator; and
the third modulator comprises a delay buffer followed by a QPSK modulator followed by an equalizer training sequence inserter followed by an IF modulator.

20. The transmitter of claim 17, wherein:
the first modulator performs DQPSK modulation followed by a differential modulation over frequency;
the second modulator performs QPSK modulation; and
the third modulator performs QPSK modulation.

* * * * *